United States Patent [19]
Wakabayashi et al.

[11] Patent Number: 5,419,854
[45] Date of Patent: May 30, 1995

[54] ORGANIC SOLID ELECTROLYTE AND COLORING-DISCOLORING DEVICE USING THE SAME

[75] Inventors: Masaki Wakabayashi, Kurobe; Akira Ishibashi, Toyama, both of Japan

[73] Assignee: Yoshida Kogyo K.K., Tokyo, Japan

[21] Appl. No.: 170,805

[22] Filed: Dec. 21, 1993

[30] Foreign Application Priority Data

Dec. 25, 1992 [JP] Japan .................. 4-357936

[51] Int. Cl.$^6$ .................. G02F 1/00; H01M 6/16
[52] U.S. Cl. .................. 252/583; 359/265; 429/192; 429/193
[58] Field of Search .............. 359/265, 270, 272, 275; 252/583; 429/192, 193

[56] References Cited
U.S. PATENT DOCUMENTS 5,223,353  6/1993  Ohsawa et al. .............. 429/192

FOREIGN PATENT DOCUMENTS 63-76273   4/1988  Japan .
63-173314  7/1988  Japan .
2-80462    3/1990  Japan .
2-87482    3/1990  Japan .
2-138364   5/1990  Japan .

Primary Examiner—Philip Tucker
Attorney, Agent, or Firm—Hill, Steadman & Simpson

[57] ABSTRACT

An organic solid electrolyte and an electrochromic device using the electrolyte are disclosed. The organic solid electrolyte comprises in combination a monosaccharide represented by the general formula: $(CH_2O)n$ wherein n is an integer of 5 to 7, or a derivative thereof, as at least part of a substrate, and a salt. The electrochromic device is manufactured by interposing the organic solid electrolyte between a transparent electrode having an electrochromic substance deposited thereon and a counter electrode.

12 Claims, 1 Drawing Sheet

ORGANIC SOLID ELECTROLYTE AND COLORING-DISCOLORING DEVICE USING THE SAME

BACKGROUND OF THE INVENTION

1. Field of the Invention

This invention relates to a composition of an organic solid electrolyte and a coloring-discoloring device or color developing changing device resorting to electrochromism as the principle of operation thereof, which incorporates therein the organic solid electrolyte. The term "electrochromism" refers to the phenomenon of a reversible change in color or the transmittance of light caused by the oxidation-reduction reaction occurring on the surface or in the neighborhood of an electrode in response to the application of voltage thereto, for example.

2. Description of the Prior Art

Organic solid electrolytes are fulfilling an important role as an electrolyte for batteries and as an electrolyte for electrochromic devices. The conventional organic solid electrolytes, however, are not fully satisfactory in terms of performance quality, productivity, and price and, therefore, are usable only in limited applications as compared with liquid electrolytes. The color developing-changing devices which use electrochromism are in need of electrolytes excelling in ionic conductivity because their speed of coloration and decoloration is varied by the performance quality of electrolyte used.

The organic solid electrolytes which have been reported to the art to date include those using a polyether as a substrate (published Japanese Patent Application, KOKAI (Early Publication) No. SHO 63-76,273), those using a TCNQ salt (7,7,8,8-tetracyano-p-quinodimethane) (published Japanese Patent Application, KOKAI No. SHO 63-173,314), those using an organopolysiloxane (published Japanese Patent Application, KOKAI No. HEI 2-80,462), and those using a polyethylene glycol (published Japanese Patent Application, KOKAI No. HEI 2-138,364), for example. As clearly indicated in "Handbook of New Macromolecular Compound Materials" (compiled by Polymer Academic Society (Japan) and published by Maruzen Book Co., Ltd. in 1989), however, the development of organic solid electrolytes has been carried out prevalently on composites between polyethylene oxide (PEO) and alkali metal salts and very rarely on other substances.

Heretofore, the color developing-changing devices which operate on the principle of electrochromism have mainly used liquid propylene carbonate as an electrolyte. Propylene carbonate is an excellent electrolyte which has high voltage for inducing electrolysis and possesses ability to dissolve a large amount of salt. When the device uses such a liquid electrolyte as propylene carbonate, however, it requires to be sealed most tightly because the liquid electrolyte is liable to leak. When a solid electrolyte is used, the ionic conductivity thereof is low and the operation of coloration and decoloration consumes a long time, though the possibility of leakage is nil. Since the solid electrolyte, therefore, must be shaped in the form of a thin film, the desirability of this organic solid electrolyte possessing excellent processability has been finding growing recognition.

The conventional organic solid electrolytes mentioned above allow no easy selection of a suitable solvent and suffer from inferior processability on account of high melting points. Particularly, the electrochromic devices using organochromophoric materials are not easily worked at high temperatures. The fabrication of these devices at elevated temperatures proves undesirable because the chromophoric materials yield to decomposition and degradation. Further, the use of polyethylene glycol which has prevailed to date as a substrate for electrolyte is at a disadvantage in lacking strength and necessitating a support for the retention of shape. The use of polyethylene oxide, for example, entails the disadvantage that the ionic conductivity is degraded and the operation of coloration and decoloration is hindered in consequence of the advance of crystallization.

SUMMARY OF THE INVENTION

It is, therefore, an object of the present invention to provide an organic solid electrolyte which is easy to process, excellent in ionic conductivity, easy to procure commercially, and inexpensive.

Another object of the present invention is to provide an electrochromic device using such an organic solid electrolyte.

To accomplish the objects described above, the present invention provides an organic solid electrolyte which is characterized by using a monosaccharide represented by the general formula: $(CH_2O)n$ wherein n is an integer of 5 to 7, or a derivative thereof as a substrate or part of the substrate of electrolyte.

In accordance with the present invention, there is further provided a coloring-discoloring device or color developing-changing device resorting to electrochromism as the principle of operation thereof. The device comprises a transparent electrode, a counter electrode, and an electrochromic substance and an electrolyte both interposed between the transparent electrode and the counter electrode, the electrolyte being the organic solid electrolyte mentioned above.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
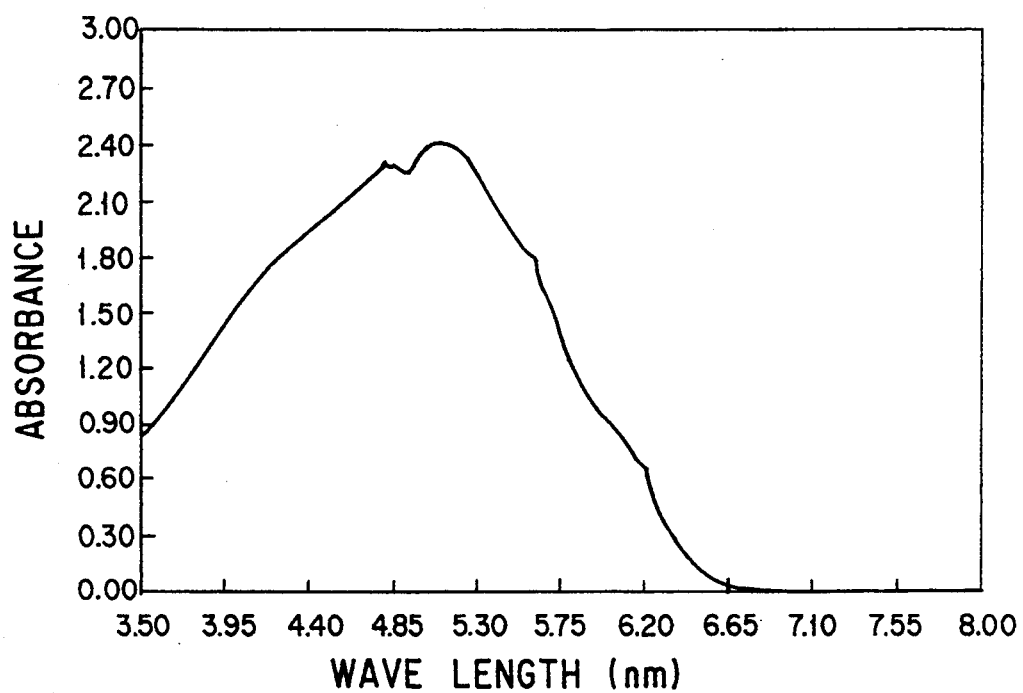
FIG. 1 is a graph showing a visible spectrum obtained of an electrochromic device produced in Example 2, which will be cited hereinbelow, prior to application of voltage to the device.

An organic solid electrolyte according to the present invention uses a monosaccharide having 5 to 7 carbon atoms or derivatives thereof such as sugar alcohols obtained by the reduction thereof or aldonic acids, uronic acids, or saccharic acids obtained by the oxidation thereof as a substrate or part of the substrate for electrolyte.

The term "monosaccharide" refers to substances which cannot be easily divided into simpler saccharides by hydrolysis and have a chemical formula: $(CH_2O)n$. Of the substances which have this chemical formula, those having 5, 6, and 7 for the variable "n" in the formula are called penrose, hexose, and heptose. These monosaccharides are widely distributed in nature and form important resources. These monosaccharides invariably possess a primary alcohol at one end thereof. They are divided into aldoses and ketoses by the groups at the other end thereof. The aldoses possess a formyl group at the other end thereof. The ketoses possess a primary alcohol at the other end thereof and a carbonyl group halfway along the length of a chain. These monosaccharides possess asymmetric carbon atoms therein and hence include stereoisomers. The sugar alcohols are obtained by reducing corresponding monosaccharides. The aldonic acids are obtained by oxidizing the aldehyde group of aldoses into a carboxyl group. The aldouronic acids are obtained by oxidizing the $\omega$-alcohol group of aldoses into a carboxyl group, the ketouronic acids by oxidizing the $\omega$-alcohol group of ketoses into a carboxyl group, and the 2-ketoaldonic acids by oxidizing a primary alcohol into a carboxyl group. The saccharic acids are obtained by oxidizing corresponding monosaccharides thereby converting the alcohol groups at the opposite ends thereof each into a carboxyl group.

The aldopentoses which are aldoses of penrose have four pairs of eight stereoisomers inclusive of the D and L forms and the ketopentoses which are ketoses of penrose have two pairs of four stereoisomers. The aldopentoses include ribose, arabinose, lyxose, and xylose and the ketopentoses include ribulose and xylulose. The sugar alcohols which originate in pentoses are called pentitols and include arabitol, xylitol, and adonitol. The saccharic acids include xylosaccharic acid, ribosaccharic acid, and arabosaccharic acid.

The hexoses include eight pairs of 16 stereoisomers in aldohexoses and four pairs of eight stereoisomers in ketohexoses. The aldohexoses include galactose, talose, altrose, allose, glucose, idose, mannose, and gulose and the ketohexoses include tagarose, psicose, sorbose, and fructose the hexitols which are sugar alcohols of hexose include talitol, sorbitol, mannitol, iditol, allodulcitol, and dulcitol. The saccharic acids of hexose include mannosaccharic acid, glucosaccharic acid, idosaccharic acid, talomucic acid, alomucic acid, and mucic acid.

The heptoses include 16 pairs of 32 stereoisomers in aldoheptoses and eight pairs of 16 stereoisomers in ketoheptoses. Marked examples of aldoheptoses are D-glycero-D-gloheptose, D-glycero-D-idoheptose, D-glycero-D-galacto-heptose, D-glycero-D-manno-heptose, L-glycero-L-galacto-heptose, D-glycero-L-manno-heptose, D-glycero-L-gluco-heptose, D-glycero-L-galacto-heptose, and D-glycero-L-talo-heptose. Main examples of ketoheptoses are sedoheptulose, perseulose, D-gluco-heptulose, L-gluco-heptulose, and D-manno-heptulose. The heptitols which are sugar alcohols of heptose include theoretically possible 16 isomers of which 13 isomers have been confirmed. These known isomers of heptitols are glyceroglohepitol, D-glycero-D-ido-heptitol, L-glycero-L-ido-heptitol, D-glycero-D-galacto-heptitol, L-glycero-L-galacto-heptitol, D-glycero-D-manno-heptitol, D-glycero-D-gluco-heptitol, L-glycero-L-gluco-heptitol, D-glycero-L-gluco-heptitol, L-glycero-D-gluco-heptitol, glyceroidoheptitol, glyceroalloheptitol, and D-glycero-D-altro-heptitol. The aldonic acids of heptose include 32 stereoisomers. Marked examples of these stereoisomers are D-glycero-D-gluco-heptonic acid, D-glycero-D-ido-heptonic acid, D-glycero-D-galacto-heptonic acid, D-glycero-D-manno-heptonic acid, L-glycero-L-galacto-heptonic acid, D-glycero-L-manno-heptonic acid, D-glycero-L-galacto-heptonic acid, and D-glycero-L-talo-heptonic acid.

These monosaccharides and derivatives thereof have many hydroxyl groups in the molecule thereof and, therefore, are capable of dissolving numerous salts. The salts which can be dissolved therein have no particular restriction except for the requirement that they should be capable of ionic dissociation. Thus, such salts exhibit good solubility in monosaccharides and derivatives thereof. This ability is ideally manifested particularly by alkali metal salts such as, for example, $LiCl_4$, $KClO_4$, $NaClO_4$, $LiBF_4$, $KBF_4$, $NaBF_4$, $LiAsF_6$, $KAsF_6$, $NaAsF_6$, $KSCN$, $LiSCN$, $NaSCN$, $LiCF_3SO_3$, $KCF_3SO_3$, $NaCF_3SO_3$, $LiBr$, $NaBr$ and $KBr$. With lithium perchlorate, for example, the monosaccharide or a derivative thereof produces a mixture which allows preparation of a transparent thin film even when the amount of this metal salt exceeds 50% by weight based on the amount of the mixture.

The monosaccharides and derivatives thereof mentioned above exhibit solubility in water and permit manufacture of electrolytic films thereof by the casting of aqueous solutions thereof. Usually, a transparent organic solid electrolyte having good ionic conductivity may be produced by preparing an aqueous solution containing a salt and said monosaccharides or derivatives thereof, casting the solution on a suitable substrate, and effecting vacuum drying while heating the casted coating. Further, arabinose, xylose, ribulose, idose, psicose, and fructose are soluble in alcohols and allow manufacture of their films by the casting of alcohol solutions thereof. The melting points of the monosaccharides and derivatives thereof are generally below 200° C. Thus, they can be manufactured into films by being molten and mixed with a salt.

The monosaccharides or derivatives thereof may be used as carried on a porous substance or as dispersed in a suitable matrix substance. Since they excel in compatibility with polysaccharides, they may be used as mixed with polysaccharides. Further, they may be used in the form of mixtures thereof with various saccharides such as sucrose, gluten, and agar or in the form of mixtures thereof with polyvinyl alcohol.

The application of a monosaccharide or a derivative thereof to a color developing-changing device which operates on the principle of electrochromism can be advantageously realized by previously having an electrochromic substance deposited on a transparent electrode, optionally having an oxidation-reduction substance deposited on a counter electrode, and then having a solid electrolyte using the monosaccharide or derivative thereof as a substrate for electrolyte interposed between the two electrodes mentioned above and joined tightly thereto. The aforementioned solid electrolyte which uses the monosaccharide or derivative thereof as the substrate inherently possesses adhesive force enough to fix the opposite electrodes in place and, therefore, allow impartation of an ideal color-generating ability to the produced device without requiring interposition of any special support between the electrodes. ITO (indium tin oxide) may be advantageously used as the transparent electrode and as the counter electrode. When the transparency is not required for the counter electrode, such an electrode as metal or carbon electrode which is commonly used in electrochemical devices may be used as the counter electrode.

Various electrochromic substances are known in the art and may be used in the present invention. Among the other electrochromic substances, an electroconductive polymer having a chromophoric group may be advantageously used in the present invention. Examples of the chromophoric group-containing polymer include, but are not limited to: conjugated aromatic polymers such as phenylene polymer, naphthalene polymer, anthracene polymer, and azulene polymer; conjugated heterocyclic polymers such as thiophene polymer, alkylthiophene polymer, selenophene polymer, pyrrole polymer, pyridine polymer, and furan polymer; heteroatom-containing conjugated polymers such as aniline polymer; polymers having a $\pi$ electron conjugated group such as ferrocene and phthalocyanine in the side chain thereof; combinations thereof; modifications thereof obtained by introducing an alkyl group or a similar thereinto as a side chain thereof such as 3-alkyl thiophene polymer; and modifications thereof obtained by introducing an alkyl group into the terminal thereof. These substances are caused to manifest their inherent coloration and discoloration in consequence of the electrochemical oxidation-reduction. The term "polymer" as used herein is to be construed as including oligomers.

Now, the present invention will be described more specifically below with reference to working examples.

EXAMPLE 1

An aqueous solution containing 15% by weight of mannitol and 15% by weight of lithium perchlorate was prepared and spread on an ITO (indium tin oxide) glass plate by the use of a spin coater. The spread solution on the glass plate was left drying in a vacuum drier at 70° C. for 30 hours. A transparent film about 1 μm in thickness was obtained consequently. The plate was subjected to vacuum deposition of gold to form an electrode of gold on the thin film. When a potential of about 1 volt was applied between the gold electrode and the ITO glass plate to determine the electroconductivity of the thin film, the electroconductivity was found to be $2.6 \times 10^{-8}$ Scm$^{-1}$.

EXAMPLE 2

Figure 2:
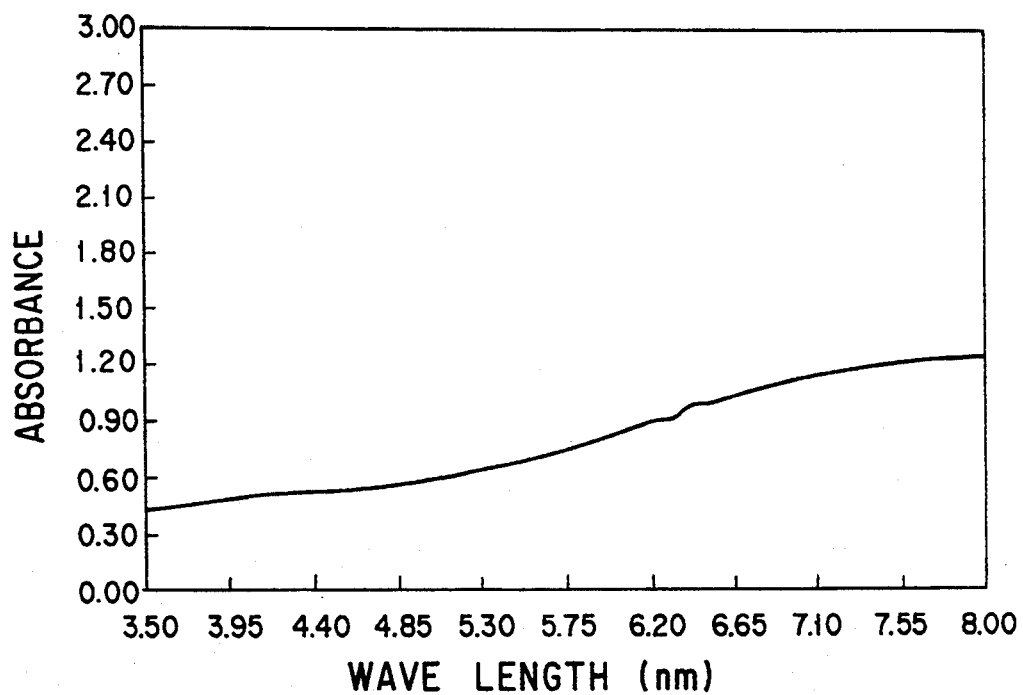
FIG. 2 is a graph showing a visible spectrum obtained of the electrochromic device produced in Example 2 immediately after application of a voltage of 3V to the device.

An aqueous solution containing 15% by weight of mannitol and 15% by weight of lithium perchlorate was prepared and dropped on an ITO glass plate coated in advance with polydodecyl thiophene. The ITO glass plate thus coated with the solution and another ITO glass plate tightly joined thereto were together left drying in a vacuum drier at 70° C. for 40 hours, to produce an electrochromic device. The device consequently obtained assumed a red color. When a potential of 3 volts was applied to the device with the ITO electrode coated with polydodecyl thiophene on the plus side, the device changed color to blue. When this application of the same potential to the device was repeated, this time with said electrode on the minus side, the device changed color to red. A visible spectrum obtained before the application of the potential is shown in FIG. 1 and a visible spectrum obtained immediately after the application of the potential in FIG. 2.

EXAMPLE 3

Sorbitol was molten at a temperature of about 105° C. By using this melt, a solution containing 60% by weight of lithium perchlorate (No. 3-1), 40% by weight of potassium thiocyanate (No. 3-2), 30% by weight of lithium tetrafluoroborate (No. 3-3), or 50% by weight of lithium trifluoromethane sulfonate (No. 3-4) was prepared. The content of salt in each solution corresponds to the maximum solubility in which the transparency of a solid electrolyte can be maintained. The prepared solution was applied to a platinum plate, cooled, and thereafter dried in a vacuum drier at a normal temperature for 48 hours. After drying, another platinum plate was pressed and tightly joined to the resultant film on the platinum plate to form an electrode. An electric resistance of the film was measured by means of an impedance analyzer (Model 4142ALF manufactured by, Yokogawa-Hewlett-Packard, Ltd.) and determined by the Cole-Cole plotting method. The electroconductivity was calculated based on the obtained electric resistance. The measurement was carried out at temperatures of 23° C., 40° C., 60° C., 80° C., and 100° C., respectively. After the measurement of electric resistance, the moisture content of the obtained solid electrolyte was measured. The results are shown in Table 1.

TABLE 1

| No. | Composition of solid electrolyte (wt %) | | Electroconductivity (Scm$^{-1} \times 10^{-5}$) | | | | | Moisture content (wt %) |
|---|---|---|---|---|---|---|---|---|
| | Matrix of solid electrolyte | Salt | 23° C. | 40° C. | 60° C. | 80° C. | 100° C. | |
| 3-1 | Sorbitol (40) | LiClO$_4$ (60) | 0.329 | 1.77 | 9.62 | 38.4 | 131 | 0.3345 |
| 3-2 | Sorbitol (60) | KSCN (40) | 1.320 | 3.88 | 20.1 | 109 | 317 | 0.0923 |
| 3-3 | Sorbitol (70) | LiBF$_4$ (30) | 0.669 | 1.43 | 4.32 | 25.1 | 137 | 0.1940 |
| 3-4 | Sorbitol (50) | LiCF$_3$SO$_3$ (50) | 0.0705 | 0.228 | 3.84 | 5.64 | 215 | 0.1550 |

EXAMPLE 4

40% by weight of sorbitol was mixed with 10% by weight of sucrose and the mixture was molten at a temperature of about 105° C. By using this melt, a solution containing 50% by weight of lithium perchlorate was prepared. A sample was prepared and subjected to measurement of the electric resistance thereof in the same manner as in Example 3. When the electroconductivity was calculated based on the electric resistance measured at a temperature of 23° C., it was found that the film had the electroconductivity of $3.77 \times 10^{-7}$ Scm$^{-1}$. The moisture content of the obtained solid electrolyte was 0.289%.

EXAMPLE 5

40% by weight of sorbitol was mixed with 10% by weight of melezitose and the mixture was molten at a temperature of about 105° C. By using this melt, a solution containing 50% by weight of lithium perchlorate was prepared. A sample was prepared and subjected to measurement of the electric resistance thereof in the same manner as in Example 3. When the electroconductivity was calculated based on the electric resistance measured at a temperature of 23° C., it was found that the film had the electroconductivity of $8.00 \times 10^{-7}$ Scm$^{-1}$. The moisture content of the obtained solid electrolyte was 0.440%.

EXAMPLE 6

35% by weight of sorbitol was mixed with 15% by weight of xylose and the mixture was molten at a temperature of about 105° C. By using this melt, a solution containing 50% by weight of lithium perchlorate was prepared. A sample was prepared and subjected to measurement of the electric resistance thereof in the same manner as in Example 3. When the electroconductivity was calculated based on the electric resistance measured at a temperature of 23° C., it was found that the film had the electroconductivity of $8.25 \times 10^{-6}$ Scm$^{-1}$. The moisture content of the obtained solid electrolyte was 0.286%.

EXAMPLE 7

59.5% by weight of sorbitol was mixed with 10.5% by weight of glucose and the mixture was molten at a temperature of about 105° C. By using this melt, a solution containing 30% by weight of lithium perchlorate was prepared.. A sample was prepared and subjected to measurement of the electric resistance thereof in the same manner as in Example 3. When the electroconductivity was calculated based on the electric resistance measured at a temperature of 23° C., it was found that the film had the electroconductivity of $2.00 \times 10^{-6}$ Scm$^{-1}$. The moisture content of the obtained solid electrolyte was 0.502%.

EXAMPLE 8

45% by weight of sorbitol was mixed with 5% by weight of mannitol and the mixture was molten at a temperature of about 105° C. By using this melt, a solution containing 50% by weight of lithium perchlorate was prepared. A sample was prepared and subjected to measurement of the electric resistance thereof in the same manner as in Example 3. When the electroconductivity was calculated based on the electric resistance measured at a temperature of 23° C., it was found that the film had the electroconductivity of $2.20 \times 10^{-6}$ Scm$^{-1}$. The moisture content of the obtained solid electrolyte was 0.292%.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by foregoing description and all changes which come within the meaning and range of equivalency of the claims are, therefore intended to be embraced therein.

What is claimed is:

1. An organic solid electrolyte comprising in combination:
   (a) at least one compound selected from the group consisting of pentose, hexose, heptose, sugar alcohols thereof, aldonic acids thereof, uronic acids thereof, and saccharic acids thereof, as at least part of a substrate; and
   (b) a salt.

2. An organic solid electrolyte according to claim 1, wherein said salt is selected from the group consisting of LiClO$_4$, KClO$_4$, NaClO$_4$, LiBF$_4$, KBF$_4$, NaBF$_4$, LiAsF$_6$, KAsF$_6$, NaAsF$_6$, KSCN, LiSCN, NaSCN, LiCF$_3$SO$_3$, KCF$_3$SO$_3$, NaCF$_3$SO$_3$, LiBr, NaBr and KBr.

3. An organic solid electrolyte according to claim 1, wherein said salt is selected from the group consisting of LiClO$_4$, KClO$_4$, NaClO$_4$, LiBF$_4$, KBF$_4$, NaBF$_4$, LiAsF$_6$, KAsF$_6$, and NaAsF$_6$.

4. An organic solid electrolyte according to claim 1, which further comprises in combination another substrate.

5. An organic solid electrolyte comprising:
   (a) at least one carrier compound selected from the group consisting of penrose, hexose, heptose, sugar alcohols thereof, aldonic acids thereof, uronic acids thereof, and saccharic acids thereof; and
   (b) at least one salt selected from the group consisting of LiClO$_4$, KClO$_4$, NaClO$_4$, LiBF$_4$, KBF$_4$, NaBF$_4$, LiAsF$_6$, KAsF$_6$, and NaAsF$_6$, the salt being incorporated into said carrier compound.

6. An organic solid electrolyte in the form of a thin film, comprising in combination:
   (a) at least one carrier compound selected from the group consisting of penrose, hexose, heptose, sugar alcohols thereof, aldonic acids thereof, uronic acids thereof, and saccharic acids thereof; and
   (b) at least one salt selected from the group consisting of LiClO$_4$, KClO$_4$, NaClO$_4$, LiBF$_4$, KBF$_4$, NaBF$_4$, LiAsF$_6$, KAsF$_6$, and NaAsF$_6$.

7. In a coloring-discoloring device operating on the principle of electrochromism and comprising a transparent electrode, a counter electrode, and an electrochromic substance and an electrolyte both interposed between said transparent electrode and said counter electrode, the improvement in which said electrolyte is an organic solid electrolyte comprising in combination:
   (a) at least one compound selected from the group consisting of pentose, hexose, heptose, sugar alcohols thereof, aldonic acids thereof, uronic acids thereof, and saccharic acids thereof, as at least part of a substrate; and
   (b) a salt.

8. A device according to claim 7, wherein said salt is selected from the group consisting of LiClO$_4$, KClO$_4$, NaClO$_4$, LiBF$_4$, KBF$_4$, NaBF$_4$, LiAsF$_6$, KAsF$_6$, NaAsF$_6$, KSCN, LiSCN, NaSCN, LiCF$_3$SO$_3$, KCF$_3$SO$_3$, NaCF$_3$SO$_3$, LiBr, NaBr and KBr.

9. A device according to claim 7, wherein said organic solid electrolyte further comprises in combination another substrate.

10. A device according to claim 7, wherein said electrochromic substance is coated on the transparent electrode and said organic solid electrolyte is in contact with said electrochromic substance on the transparent electrode and said counter electrode.

11. An electrochromic device comprising:
    a transparent electrode having an electrochromic substance coated thereon,
    a counter electrode; and
    an organic solid electrolyte interposed between said transparent electrode and said counter electrode and contacting with said electrochromic substance on the transparent electrode and said counter electrode, said organic solid electrolyte being a film which comprises in combination (a) at least one carrier compound selected from the group consisting of penrose, hexose, heptose, sugar alcohols thereof, aldonic acids thereof, uronic acids thereof, and saccharic acids thereof and (b) at least one salt selected from the group consisting of LiClO$_4$, KClO$_4$, NaClO$_4$, LiBF$_4$, KBF$_4$, NaBF$_4$, LiAsF$_6$, KAsF$_6$, NaAsF$_6$, KSCN, LiSCN, NaSCN, LiCF- $_3SO_3$, $KCF_3SO_3$, $NaCF_3SO_3$, LiBr, NaBr and KBr.

12. A device according to claim 7 or 11, wherein said electrochromic substance is at least one electroconductive polymer having a chromophoric group selected from the group consisting of phenylene polymer, naphthalene polymer, anthracene polymer, azulene polymer, thiophen polymer, alkylthiophene polymer, selenophene polymer, pyrrole polymer, pyridine polymer, furan polymer, aniline polymer, polymer having ferrocene in a side chain thereof, polymer having phthalocyanine in the side chain thereof, modifications of said polymers obtained by introducing an alkyl group thereinto as a side chain thereof, and modifications of said polymers obtained by introducing an alkyl group into a terminal thereof.

* * * * *